United States Patent
Hay et al.

Patent Number: 5,951,764
Date of Patent: Sep. 14, 1999

[54] COATING APPARATUS FOR CONTINUOUS TOW

[76] Inventors: Randall S. Hay, 44 Hawthorne Glenn Trail, Beavercreek, Ohio 45440; Dennis Petry, 9299 Sandra Dr., New Paris, Ohio 45347

[21] Appl. No.: 08/935,311

[22] Filed: Aug. 15, 1997

[51] Int. Cl.$^6$ ........................................................ B05C 3/12
[52] U.S. Cl. ........................................... 118/420; 118/405
[58] Field of Search ............................... 427/163.2, 169, 427/434.6, 434.7; 118/420, DIG. 18, DIG. 19, 65

[56] References Cited

U.S. PATENT DOCUMENTS

| | | | |
|---|---|---|---|
| 1,786,416 | 12/1930 | Martindell | 118/65 |
| 1,841,484 | 1/1932 | Larsen | 118/DIG. 19 |
| 1,947,993 | 2/1934 | Larsen | 118/65 |
| 3,960,530 | 6/1976 | Iyengar | 118/405 |
| 4,512,279 | 4/1985 | Damrau | 118/411 |
| 5,164,229 | 11/1992 | Hay | 427/226 |
| 5,217,533 | 6/1993 | Hay et al. | 118/63 |

*Primary Examiner*—Brenda A. Lamb
*Attorney, Agent, or Firm*—Charles E. Bricker; Thomas L. Kundert

[57] ABSTRACT

An apparatus for coating a continuous fiber which comprises: (a) a coating composition container having an orifice in the bottom portion thereof, coating composition inlet means in the lower portion thereof and fluid inlet means in the upper portion thereof; (b) a furnace positioned above the coating container in axial alignment with the orifice in the coating composition container; (c) means for transporting a continuous fiber tow to be coated through the orifice, through the coating composition in the coating composition container, and through the furnace, including a source of continuous tow, a lower alignment and tensioning means, an upper alignment and tensioning means, and takeup means; (d) a catch vessel positioned below the lower alignment and tensioning means for collecting excess coating composition; and (e) means for removing coating composition from the catch vessel and passing the same to a surge vessel having an outlet in the lower portion thereof in fluid communication with the coating composition inlet means in the coating composition container;

wherein the orifice in the coating composition container is of sufficient diameter that the continuous fiber need have no contact therewith, and preferably, has no contact therewith; and wherein the path of the tow is substantially vertical between the lower alignment and tensioning means and the upper alignment and tensioning means, and about 45° to 135° from the vertical between the lower alignment and tensioning means and the source of continuous tow. For coating in a controlled atmosphere, the apparatus further comprises (f) connecting means between the coating composition container and the furnace for maintaining the same atmosphere between the two.

1 Claim, 1 Drawing Sheet

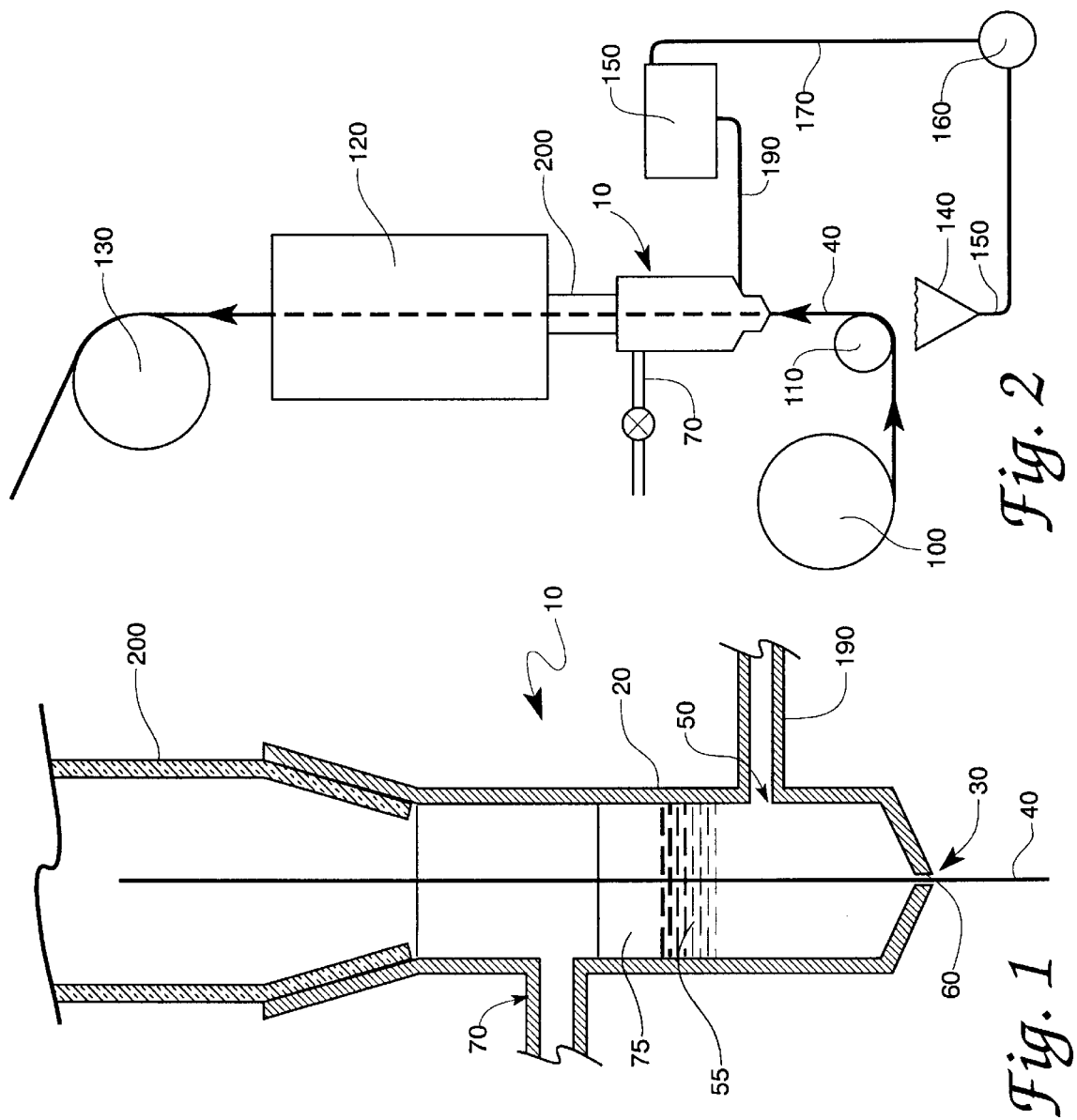

COATING APPARATUS FOR CONTINUOUS TOW

RIGHTS OF THE GOVERNMENT

The invention described herein may be manufactured and used by or for the Government of the United States for all governmental purposes without the payment of any royalty.

BACKGROUND OF THE INVENTION

This invention relates to an apparatus for the coating of continuous fiber tow. It also relates to a method for coating continuous fiber tow.

Composite materials are widely known and widely used. By combining a polymer with another material, such as glass, carbon, another polymer, or the like, it is possible to obtain unique combinations or levels of properties. Similarly, by combining a metal or glass with selected fibers, it is possible to obtain unique combinations or levels of properties. Advanced composites have evolved as a class of structural materials as a result of the development of high-modulus, high-strength, low-density reinforcing fibers.

The presence of a carbon interlayer along the fiber-matrix interface has been shown to be responsible for the high toughness and strain to failure of Nicalone® (SiC fiber)/lithium aluminosilicate glass composites and Nicalon®/Ba-Si-Al oxynitride glass composites. However, these composites are not viable for high temperature oxidizing environments. Such environments require oxidation resistant fibers, matrices and interlayers. One approach to fabricating a fiber-matrix interface is to introduce an interlayer as a fiber coating before the composite is densified. After densification, the interlayer chosen should cause crack deflection and fiber pullout similar to carbon interlayers, or should provide oxidation resistance for other interlayers.

Several types or combinations of interlayers are considered to be feasible, including microporous interlayers, reactive interlayers which lose volume, and interlayers with ductile particles. However, application of a coating, particularly a uniform coating, to continuous fibers and fiber tows can be difficult. Measurement of coating thickness can also be difficult.

Several techniques are known for applying coatings to continuous fibers. Fiber coating may be accomplished by passing the fibers through a container filled with a coating liquid, which container has one or more rollers or wheels to keep the fiber immersed in the liquid while coating. One disadvantage of this process is that the fibers must be bent around the roller(s) or wheel(s) and may sustain damage from bending or abrasion. Other disadvantages are that the fibers may be contaminated from contact with the wheel or roller and that fibers which do not tolerate a small bending radius are prone to breakage or require a very large wheel and container.

Coatings may also be applied by spraying. The primary disadvantage of this coating method is that spraying is a line of sight process, so coating thickness is dependent upon the angle at which the spray jet contacts the fiber. Other disadvantages are that spray jets tend to clog easily, the characteristics of the jet may change with time, making control of the process difficult, viscous coating solutions are difficult to apply as a spray, low viscosity solutions tend to run off the fiber before they are cured, and the spray may be shadowed from inner tow filaments by the outer tow filaments.

Fibers may be coated by passing same through a container having a gasket which seals around the moving fiber and prevents coating liquid from flowing out. The disadvantages of this method are that the fiber surface may be contaminated or abraded by contact with the gasket, and fibers having irregular cross-sections or multifilament fibers or tows tend to get caught along irregularities or at broken fibers in gaskets tight enough to prevent leakage of the liquid.

Hay et al, U.S. Pat. No. 5,217,533, disclose an apparatus and method for coating continuous fibers in which a continuous fiber is transported through a coating composition container having an orifice in the bottom. Excess coating composition flowing out of the container is deflected from the fiber. In a preferred mode, the fiber does not contact the coating apparatus. The coating on the fiber may be cured immediately after the coating step.

Hay, U.S. Pat. No. 5,164,229, discloses an apparatus and method for coating continuous tow in which a continuous tow is likewise transported through a coating composition container having an orifice in the bottom. Excess coating composition flowing out of the container is deflected from the tow. According to this method, the coated tow is transported through a liquid which is immiscible with the coating composition and which acts to remove excess coating composition from between the individual fibers of the tow.

While both of these patents represent valuable advances in the state of the art, each of the methods has one or more of the following disadvantages:

(a) The coating liquid is recirculated directly into the coating vessel. The pumping rate has to be slightly faster than the rate at which the coating liquid leaves the coating vessel to insure that the coating liquid is maintained at a constant level in the coating vessel, so air is also pumped into the coating vessel. This can cause the coating liquid to froth, which in turn causes nonuniform fiber coating.

(b) The coater can only be used under conditions where the fiber and coating are stable in air. Oxidation prone coatings and fibers can not be processed at high temperatures. This is a serious disadvantage for ceramic matrix composites, since one of the most promising coating concepts involves applying carbon as a fugitive phase. In the fugitive phase concept, carbon, or a carbon-oxide mixture is applied to the fiber. The fiber is incorporated into a composite and densified under reducing conditions where the carbon is stable. The dense composite is then heat-treated in air to oxidize the carbon away, leaving pores or a gap along the fiber matrix interface. This porous interface, or gap, deflects cracks and promotes fiber pullout, making the composite flaw tolerant.

(c) While the coater can be used for most commercially available fiber tows, certain tow has very small filament diameters, many free ends, and some limp strands that do not support full fiber tension. If a free end or limp strand were to hang up in the orifice at the bottom of the coater, it will unravel the tow, rather than break off, because of the high strength and fine diameter of the filaments. This creates a larger obstruction in the orifice for other free ends and limp strands. Eventually the entire orifice plugs up and the fiber pulls apart. In principle this problem could be easily solved by making a much larger diameter orifice, but in practice a larger orifice is impractical because of the very high liquid pumping rates required and the consequent liquid foaming.

(d) A further limitation was that only one coating can be applied at a time. If two different coatings are desired, two separate runs through the coater are required.

It is an object of the present invention to provide an improved apparatus for coating continuous fiber tow.

It is a further object of the present invention to provide an improved method for coating continuous fiber tow.

Other objects, aspects and advantages of the present invention will become apparent to those skilled in the art from a reading of the following detailed description of the invention.

DESCRIPTION OF THE DRAWINGS

In the drawings,

FIG. 1 illustrates the coating apparatus of this invention; and

FIG. 2 illustrates an overall coating process.

SUMMARY OF THE INVENTION

In accordance with the present invention, there is provided an apparatus for coating a continuous fiber tow which comprises:

(a) a coating composition container having an orifice in the bottom portion thereof, coating composition inlet means in the lower portion thereof and fluid inlet means in the upper portion thereof;

(b) a furnace positioned above the coating container in axial alignment with the orifice in the coating composition container;

(c) means for transporting a continuous fiber tow to be coated through the orifice, through the coating composition in the coating composition container, and through the furnace, including a source of continuous tow, a lower alignment and tensioning means, an upper alignment and tensioning means, and takeup means;

(d) a catch vessel positioned below the lower alignment and tensioning means for collecting excess coating composition; and (e) means for removing coating composition from the catch vessel and passing the same to a surge vessel having an outlet in the lower portion thereof in fluid communication with the coating composition inlet means in the coating composition container;

wherein the orifice in the coating composition container is of sufficient diameter that the continuous fiber need have no contact therewith, and preferably, has no contact therewith; and wherein the path of the tow is substantially vertical between the lower alignment and tensioning means and the upper alignment and tensioning means, and about 45° to 135° from the vertical between the lower alignment and tensioning means and the source of continuous tow.

For coating tow under a controlled atmosphere, the apparatus further comprises (f) connecting means between the coating composition container and the furnace for maintaining the same atmosphere between the two.

DESCRIPTION OF THE PREFERRED EMBODIMENTS

Referring to FIG. 1, the coating apparatus of this invention, designated generally by the numeral 10, comprises a coating composition container 20 having a nozzle 30 in the bottom portion thereof through which a continuous fiber tow 40 can be drawn. Inlet 50 is provided in the lower portion of container 20 for replenishing the coating composition 55.

Nozzle 30 has a throat passage or orifice 60 having an inner dimension sufficiently large that fiber 40 need have no contact therewith, even with vertical misalignment of fiber 40. Because passage 60 has a dimension greater than that of the fiber 40, the coating composition continuously flows through passage 60. The nozzle 30 is preferably fabricated from a material which is wetted by the coating composition. If the nozzle is made of glass, it should be flame polished to ensure that there are no burrs which might hang up limp filaments in a tow. Container 20 is further provided with a fluid inlet 70 in the upper portion thereof for admitting a gas and/or a liquid 75 immiscible with the coating composition, which will be later explained.

FIG. 2 illustrates the overall process of this invention wherein uncoated continuous fiber tow 40 is provided from a source 100 to lower alignment and tensioning means 110 which aligns the fiber for passage through the coating apparatus 10. Fiber tow 40 is passed through the coating apparatus 10, through a furnace 120 to an upper alignment and tensioning means 130, thence to takeup means, not shown. Furnace 120 is operated at a temperature sufficient to calcine the coating applied, i.e., about 750° to 1500° C. In general, the coating rate is about 0.5 to 20 cm/sec.

In operation, coating composition flowing through nozzle 30 follows tow 40 downwardly and coats at least the outer surfaces of the tow. This action tends to wick any free filaments ends and/or loose hanging strands to the remainder of the tow bundle so that these free ends and/or limp strands do not hang up in orifice 60. Any excess coating composition falls off tow 40 as it passes over lower alignment and tensioning means 110 and into catch vessel 140. Coating composition in vessel 140 is continuously removed therefrom and passed through conduit 150 to pump 160, thence through conduit 170 to surge vessel 180, wherein excess gas is allowed to rise out of the coating composition. The coating composition is drawn from the bottom of vessel 180 and returned to inlet 50 of container 20 through conduit 190. Coating composition consumed by the coating process is replenished from vessel 180.

The tows employed according to the invention are high strength tows comprising a plurality of fibers such as, for example, carbon or graphite, silica, silicon carbide, silicon nitride, silicon carbide-coated boron, boron carbide-coated boron, silicon-coated silicon carbide alumina, mullite, yttrium-aluminum oxides, beryllium-titanium composites, boron-aluminosilicate, and the like.

The coating composition may be a clay slip or slurry, a solution of a metal salt, a polymer solution or a sol, or a carbon source, such as a mixture of sugar and ammonium hydroxide. A polymer solution is an inorganic oxide network containing glass- or ceramic-forming elements such as Si, Al, Ti, Zr and the like and, optionally, modifying elements such as Mg, B and the like. The oxide network is formed by controlled hydrolysis of an organo-metallic compound such as a metal alkoxide. The net reaction to form an anhydrous oxide is generally represented by:

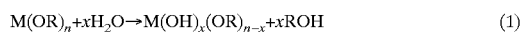

$$M(OR)_n + xH_2O \rightarrow M(OH)_x(OR)_{n-x} + xROH \qquad (1)$$

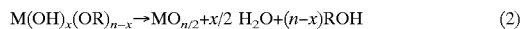

$$M(OH)_x(OR)_{n-x} \rightarrow MO_{n/2} + x/2\ H_2O + (n-x)ROH \qquad (2)$$

The hydrolysis reaction (1) may be catalyzed by the addition of acid or base. Depending on pH and water content, the hydrolysis of, for example, tetraethylorthosilicate (TEOS) can result in the formation of polymeric species ranging from polysiloxane chains to colloidal particles of essentially pure silicon dioxide. Conditions employed in the preparation of monolithic glasses or ceramics normally consist of the hydrolyzation of the alkoxide precursors with a small to large excess of water (in equation 1, above, x greater than n/2) at low to intermediate pH (about 1 to 9). These conditions can result in structures that are intermediate between linear chains and colloidal particles. The oxide network can be dried, then thermally converted to glass or ceramic. Multicomponent glasses/ceramic may be similarly prepared.

For use in the present invention, a solution is prepared containing at least about 1 weight percent, preferably at least about 4 weight percent equivalent oxide. The metal alkoxides may be prepared using techniques known in the art. For example, silicon tetrakis isopropoxide may be prepared by reacting silicon tetrachloride with isopropyl alcohol. As another example, aluminum trisisopropoxide may be prepared by the reaction of aluminum metal foil with excess isopropyl alcohol using mercuric chloride as a catalyst.

The metal alkoxide may be diluted with a C1 to C4 alcohol, e.g., methanol, ethanol, n-propanol, i-propanol, n-butanol, i-butanol, t-butanol or sec-butanol, preferably with the alcohol corresponding to the alkoxide group, to a concentration sufficiently low to avoid gellation when later hydrolyzed, yet sufficiently high to provide the desired concentration of equivalent oxide.

The ceramic materials include silicates, aluminates, yttriates, titanates, zirconates, and the like, as well as combinations therof, such as the aluminosilicates, yttrium-aluminum garnet and yttrium-aluminum monoclinic. These materials may, optionally, be modified with one or more of boron, alkali metals, alkaline earth metals, lead and the like.

In general, the immiscible liquid can be any liquid which is not miscible with the coating composition. Since the coating composition is, in general, usually an aqueous solution, the immiscible liquid can be any water-immiscible hydrocarbon. The immiscible liquid should satisfy the relation:

$$\gamma_{IF} > \gamma_{IC} + \gamma_{CF} \qquad (3)$$

where $\gamma$ represents the interfacial energy or tension, and the subscripts I, C and F refer to immiscible liquid, coating composition and filament, respectively. It is also advantageous if the immiscible liquid wets the coating composition/gas interface, as expressed by the relation:

$$\gamma_{AC} > \gamma_{IC} + \gamma_{AI} \qquad (4)$$

where the subscripts C and I are as above and the sub-script A refers to air or other gas. Good results have been obtained using hexane as the immiscible liquid. Other liquids which may be employed include heptane, perfluorohexane, dichlorohexane, I-octanol, isoamyl alcohol and the like.

The immiscible liquid acts to displace coating composition bridging fibers in the tow so that the fibers are not cemented together. Immiscible liquid consumed during the coating process is replenished through fluid inlet 70.

Referring again to FIG. 2, for coating tow under a controlled atmosphere, the apparatus further comprises connecting means 200 between the coating composition container 10 and the furnace 120 for maintaining the same atmosphere between the two. Connecting means 200 can, for example, be a high temperature glass tube having a tapered end fitting for mating with a cooperating fitting at the top of container 20, as shown in FIG. 1. A similar fitting can be provided for connecting the connecting means 200 to the furnace 120. During the coating operation, an inert gas, such as argon or nitrogen, can be introduced through fluid inlet 70.

It is within the scope of the present invention to apply two coatings to a tow or to a single filament in a single pass through the apparatus. We have, as an example, deposited an inner alumina coating and an outer carbon coating on carbon-coated Nextel® 720 fiber, 3M Corporation, Minneapolis, Minn. The alumina was derived from a sol and the carbon was derived from radiative heating of 1-octanol (the immiscible liquid) in an inert atmosphere, at a furnace temperature of 1500° C.

Various modifications may be made to the invention as described without departing from the spirit of the invention or the scope of the appended claims.

We claim:

1. An apparatus for coating a continuous fiber tow which comprises:

(a) a coating composition container for containing a coating composition to be coated onto said continuous fiber tow, said coating composition container having an orifice in the bottom portion thereof, coating composition inlet means in the lower portion thereof and fluid inlet means in the upper portion thereof for admitting a fluid selected from the group consisting of inert gas and liquid immiscible with said coating composition;

(b) a furnace positioned above said coating container in axial alignment with said orifice in said coating composition container;

(c) means for transporting a continuous fiber tow to be coated through said orifice, through said coating composition in said coating composition container, and through said furnace, including a source of continuous tow, a lower alignment and tensioning means, an upper alignment and tensioning means, and takeup means;

(d) a catch vessel positioned below said lower alignment and tensioning means for collecting excess coating composition;

(e) means for removing coating composition from said catch vessel and passing the same to a surge vessel having an outlet in the lower portion thereof in fluid communication with said coating composition inlet means in said coating composition container, said surge vessel arranged for allowing excess gas to rise out of the coating composition; and (f) connecting means between said coating composition container and said furnace for maintaining the same atmosphere between the two;

wherein said orifice in said coating composition container is of sufficient diameter that said continuous fiber has no contact therewith; and wherein the path of said tow is substantially vertical between said lower alignment and tensioning means and said upper alignment and tensioning means, and about 45° to 135° from the vertical between said lower alignment and tensioning means and said source of continuous tow.

\* \* \* \* \*